Patented Nov. 10, 1931

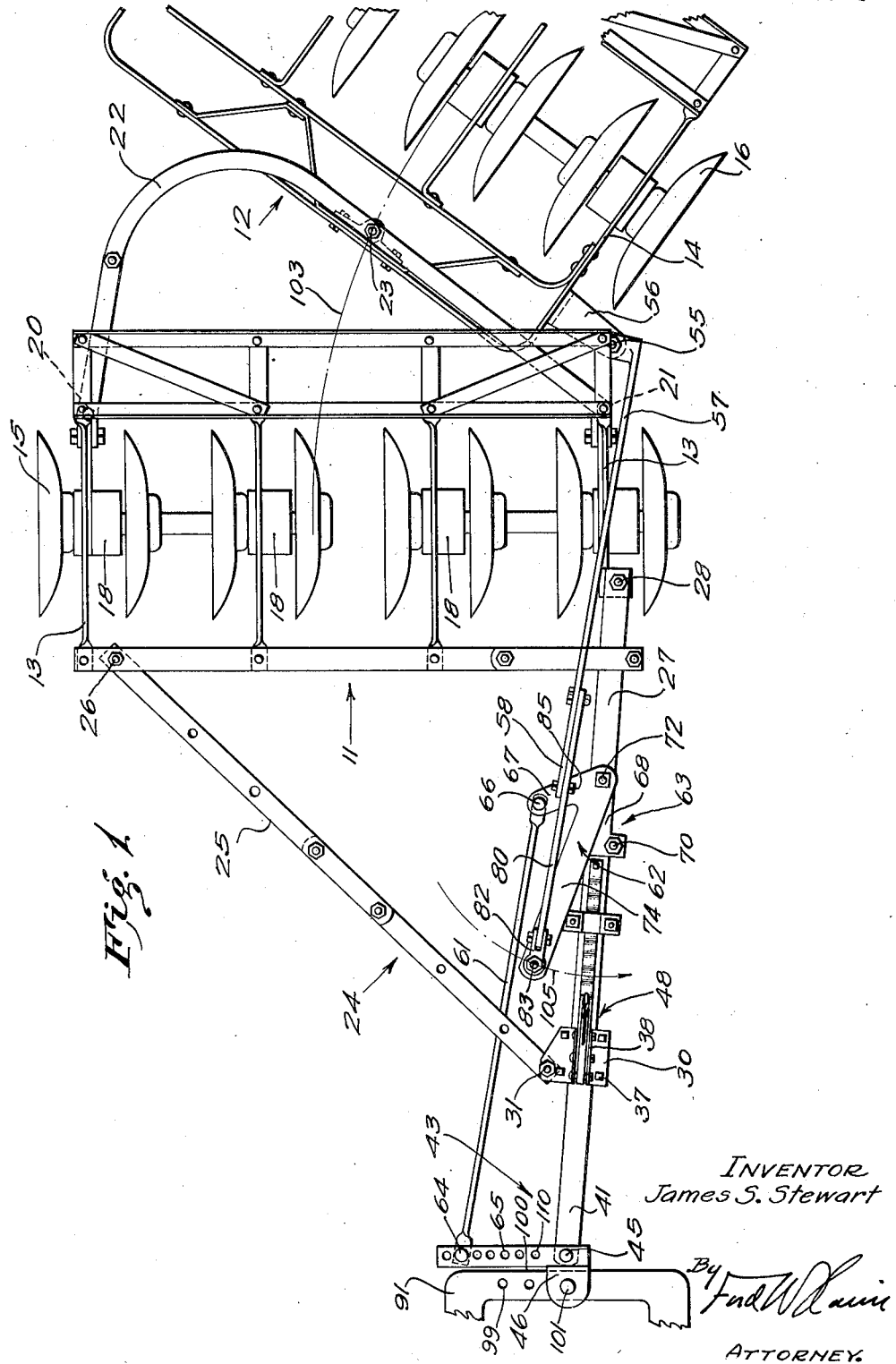

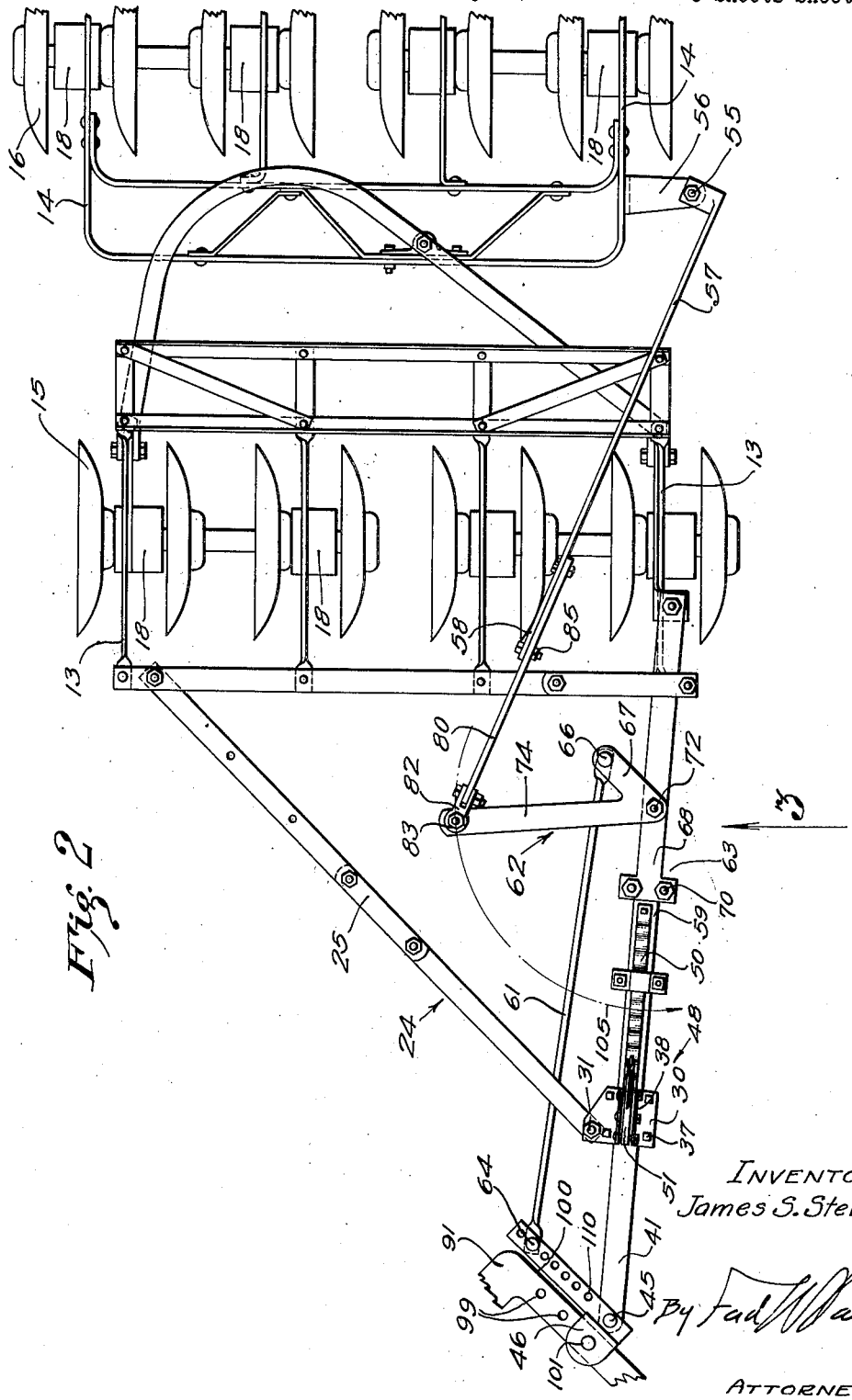

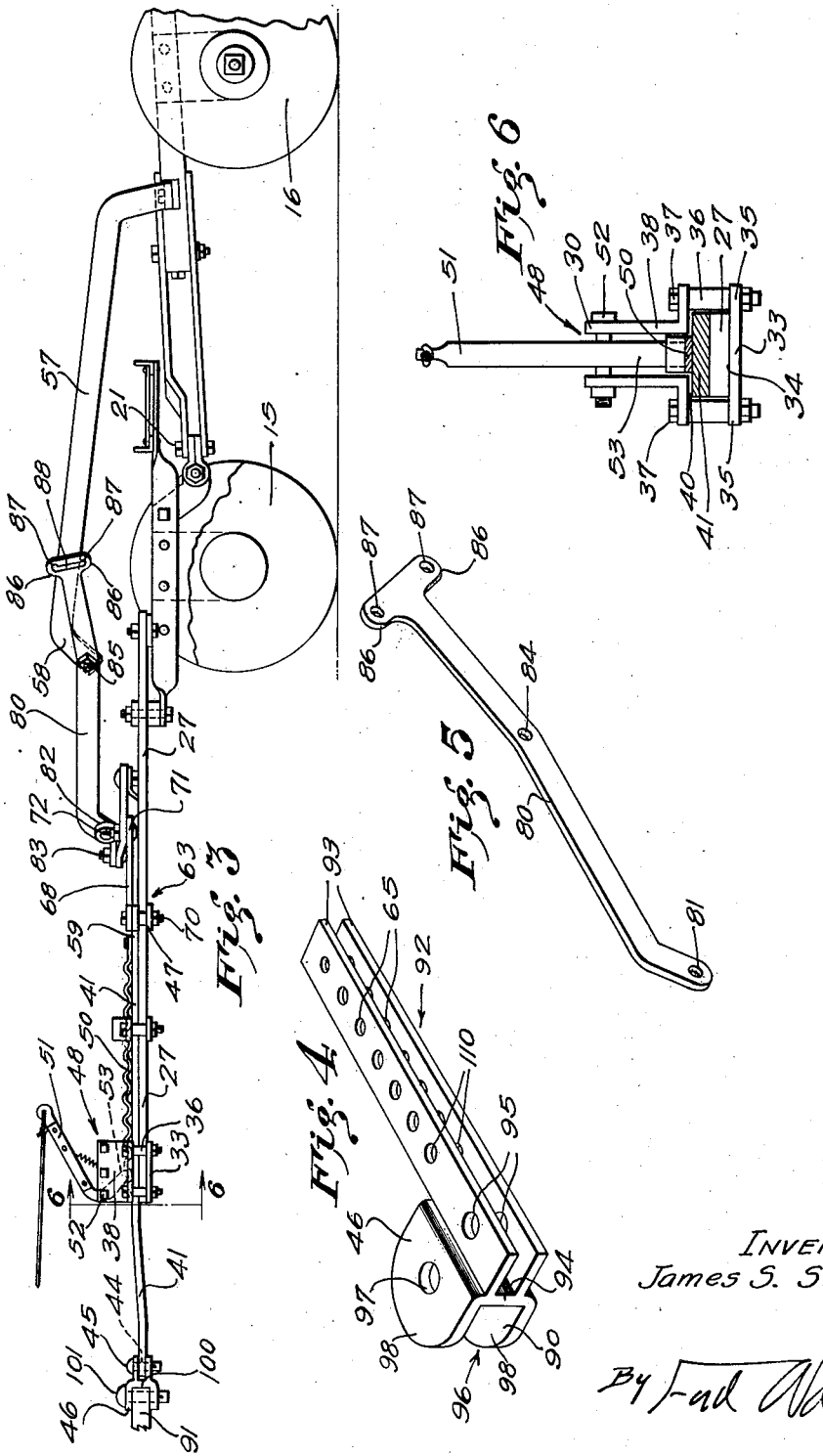

1,831,042

UNITED STATES PATENT OFFICE

JAMES S. STEWART, OF OXNARD, CALIFORNIA, ASSIGNOR TO BRENNEIS MANUFACTURING COMPANY, OF OXNARD, CALIFORNIA, A CORPORATION OF CALIFORNIA

TURNING DEVICE FOR OFFSET HARROWS

Application filed May 27, 1930. Serial No. 456,142.

My invention relates to offset harrows having automatic turning devices and relates particularly to a turning device which may be readily applied to old harrows.

Disc harrows of the general type to which this invention relates customarily include a front section and a rear section each having a gang of harrow discs. The front section is provided with a forwardly extending draft means and the rear section is pivotally attached to the front section by means of an interconnecting yoke. An angling device connects the front and rear sections in such a manner that by adjustment of this angling device the front and rear sections may be moved into and held at relatively angular positions, thus placing the front and rear discs of the harrow on separate intersecting radial lines.

When the front and rear sections of such a harrow are angled, one to the other, the complete harrow structure tends to roll over the ground on a curved path, which tendency of the harrow to roll on a curved path is employed to cause the harrow to swing into offset position behind the tractor by which it is pulled. For instance, when it is desired to offset the harrow rightwardly with respect to the tractor, the front and rear frames thereof are angled in a manner which would produce a natural leftward turning of the harrow were the front end of the harrow unrestrained by attachment to the tractor. The forward end or draft yoke of the harrow exerts a leftward force against the draft hitch carried by the tractor, but as the tractor cannot be displaced leftwardly, the rightward forces reacting in the harrow cause it to swing into rightwardly offset position behind the tractor. A tractor pulling the rightwardly offset disc harrow may be readily turned to the left for the reason that this is the direction in which the rightwardly offset harrow will naturally turn due to the angled relationship of its forward and rearward gangs of discs, but very pronounced resistance to a rightward turn is produced by a harrow set for rightward offset operation.

My invention comprehends an offset harrow having means which will automatically swing the front and rear sections into substantially tracking or trailing position, thereby reducing the minimum resistance to a turn in direction opposite to the natural turning tendency of the harrow.

It is an object of the invention to provide a harrow having draft means so connected to the pulling device, such as a tractor or other vehicle, that the cooperative parts of such draft means will move relatively when the pulling device is turned at an angle to a forward line of travel and will operate to swing the front and rear sections of the harrow from angled relationship toward trailing relationship thereby reducing the turning resistance of the harrow.

A further object of the invention is to provide a simple device which may be readily attached to a harrow of old construction, this device being adapted to move the parts of the angling means of the harrow in such a manner that when the pulling vehicle is turned from a forward line of travel, the front and rear sections of the harrow will be straightened up so that their resistance to turn will be materially lessened.

A further object of the invention is to provide a turning device having a bell crank member and a link for connecting one arm of this bell crank member to the pulling vehicle, the remaining arm of the bell crank being connected to the angling means of the harrow whereby to cause the angling means to straighten the front and rear sections of the harrow when a turn is being made.

A further object of the invention is to provide a simple draft hitch which may be secured to the pull bar of a tractor and which forms an important part of the specific embodiment of my invention disclosed in this application. The specific embodiment of my turning device herein disclosed is designed especially for use with harrows of the character disclosed in my pending application entitled "Disc harrow", Serial Number 356,832, filed April 20, 1929, but the use thereof is not limited to this harrow.

Further objects and advantages of the invention will be made evident throughout the following part of the specification.

Referring to the drawings which are for illustrative purposes only,—

Fig. 1 is a plan view showing a harrow structure embodying my invention, the front and rear sections of this harrow being shown in angled position for producing rightwardly offset travel thereof.

Fig. 2 is a plan view similar to Fig. 1 showing the harrow during a turn in positive direction.

Fig. 3 is a side elevation taken as indicated by the arrow 3 of Fig. 2.

Fig. 4 is a perspective elevation of my new draft hitch.

Fig. 5 is a perspective elevation of an extension bar which may be used in the practice of the invention.

Fig. 6 is a vertical section taken substantially on the plane represented by the line 6—6 of Fig. 3.

In keeping with the disclosure of an offset disc harrow in my pending application, Serial Number 356,832, hereinabove mentioned, I show in Figs. 1, 2 and 3 an offset harrow including a front harrow section 11 and a rear harrow section 12 which are pivotally secured together so that they may be swung into angular relationship for the purpose of producing a desired offset operation of the harrow. The harrow sections 11 and 12 respectively, include horizontal frame structures 13 and 14 on which front and rear disc assemblies 15 and 16 are mounted by means of bearings 18. Hinged to the front frame 13 at 20 and 21 is an intergang yoke 22 which is pivoted by means of a bolt or pin 23 to the forward end of the rear frame 14.

As the general construction of front and rear harrow sections is well known to the art, the minute details of construction illustrated in the drawings need not be herein described.

Extending forwardly from the front section 11 is a draft yoke 24 consisting of a diagonal bar 25 which is secured to the front frame 13 at 26, a longitudinal or forwardly extending bar 27, which is secured at 28 to the front frame 13 and has a latch head 30 secured on the forward end thereof, the forward end of the diagonal bar 25 being bolted or pinned to the latch head 30, as indicated at 31 in Fig. 1.

As shown in Fig. 6, the latch head 30 consists of a bottom plate 33 which is welded or otherwise secured to the bottom of the longitudinal bar 27 at 34 near the forward end of the bar 27. The sides 35 of the plate 33 extend beyond the sides of the bar 27 and by the use of tubular spacers 36 and bolts 37, angles 38 are secured above the bar 27 in such spaced relationship that an opening or space 40 is provided through which the main or primary bar 41 of a draft means 43 may extend. The bar 41 rests on the upper face of the bar 27 and is slidable longitudinally thereon. The forward end of the bar 41 is provided with a hole 44 through which a pin 45 may be extended, as indicated in Fig. 3.

For the purpose of attaching the bar 41 to a draft hitch 46 which is attached to a pulling device such as a tractor or other vehicle, the rear end of the bar 41 is provided with a plate 47 adapted to slide along the lower face of the bar 27. When the bar 41 is moved longitudinally relative to the bar 27, cooperative latch means 48 are provided on the bar 41 and the latch head 30 for preventing forward movement of the bar 41 relative to the bar 27. The latch means 48 consists of a corrugated or humped strip of steel 50 secured to the upper face of the bar 41 and a latch lever 51 pivoted on a bolt 52 which extends between the angles 38, the lower end 53 of the lever 51 being formed to provide a latch dog for engaging the humped strip 50 in a manner to prevent forward movement of the bar 41 through the latch head 30.

Pivotally secured at 55 to a lug 56 extending leftwardly from the rear section 12, is an angling means consisting essentially of a bar 57 of arched form so as to be secured to the leftward portion of the front section 11. In general practice the forward end 58 of the angling bar 57 is bent downwardly so that it may be connected to the rear end 59 of the bar 41. The forward end 58 of the angling bar 57 is not shown attached directly to the bar 41; such attachment is in accordance with old harrow construction. Were the bar or link 57 attached directly to the rear end 59 of the bar 41, any movement of the bar 41 on the bar 27 would be transmitted through the bar 57 to the leftward side of the rear section 12, causing the rear section 12 to swing on the pivot 23. Using old harrow parts substantially as previously described, I have made a new harrow structure which includes an automatic turning device consisting essentially of a secondary link member 61, an actuating means 62 preferably in the form of a bell crank, means 63 for securing the actuating means 62 to the rearward end of the primary draft member or slide bar 41. The forward end of the secondary link or draft member 61 pivotally engages the draft hitch 46 at a point eccentric to the pin 45, the eccentricity being controlled by moving a pin 64 from one hole 65 in the draft hitch 46 to another, and the rear end of the secondary draft member 61 is pivotally secured by means of a bolt 66 to the primary crank arm 67 of the bell crank 62. The means 63 consists of a plate 68 which may be bolted to the top of the rear extremity of the bar 41 by use of bolts or screws 70. The plate 68 has its rearward portion extending beyond the rear end of the bar 41 and by means of a bolt 72 the bell crank 62 is pivotally secured to the rearward extension 71 which in turn attaches the bell crank 62 to the rearward end of the bar 41. The bell crank 62 also includes a secondary or diagonal crank arm 74 disposed at an angle of from 60 to 70° from the primary arm 67. An essential point of the invention is the attachment of the angling bar 57 to the forward end of the secondary arm 74 so that through the swinging motion of the arm 74, the angling means represented by the bar 57 will be actuated in a manner to be herein fully described.

In order to secure the forward end 58 to the forward end of the secondary arm 74, I provide an extension 80 which may be made in the form shown in Fig. 5. This extension has a hole 81 at its forward end by which it may be bolted to a clevis 82, which clevis 82 is in turn secured to the forward end of the secondary arm 74 by a bolt 83. The extension 80 has a centrally located hole 84 for receiving a bolt 85 which has been extended through a hole existing in the forward end 58 of the angling bar 57. The rearward end of the extension 80 may be provided with laterally extending tongues 86 having holes 87 therein spaced apart a distance greater than the vertical width of the angling bar 57 in order that these holes may receive the legs of a U-bolt 88 which is placed so as to enclose a portion of the bar 57 thereby tightly clamping the bar 57 against the rearward end of the extension 80.

As shown in Fig. 4, my new draft hitch 46, which forms a cooperating part of my present invention consists of a securement portion 90 adapted for attachment to a pull bar 91 of a pulling vehicle, such as a tractor, and a lateral structure 92 consisting of upper and lower parts 93 secured to the vertical web 94 of the member 90 in laterally extending and parallel relationship. The parts or plates 93 have cooperative central openings 95 adapted to receive the draft pin 45 and a plurality of cooperative eccentric openings 65 adapted to receive the pin 64 by which the forward end of the secondary draft member 61 is pivotally attached to the draft hitch 46. The securement portion 90 of the draft hitch 46 has a forwardly directed and laterally extended slot 96 therein so that the securement portion 90 may be placed over the pull bar 91 in the manner shown in Fig. 1. Pin holes 97 in the upper and lower plates 98 of the member 90 coincide with one of a series of holes 99 in the pull bar 91 when the draft hitch is held tightly against the rearward face 100 of the pull bar 91. When a pin 101 is extended through the holes 97 of the draft hitch 46 and a hole 99 of the pull bar 91, as shown in Fig. 1, the draft hitch 46 is substantially rigidly secured to the pull bar 91 and will turn or swing laterally with the pull bar 91 when the pulling vehicle is turned from a forward line of travel.

In Fig. 1 I have shown the primary draft member or slide bar 41 moved outwardly on the bar 27 of the draft yoke 24 to such position that the angling means 57 holds the rear section 12 of the harrow in angled position during forward movement of the pulling vehicle. When the front and rear sections 11 and 12 are relatively angled, as shown in Fig. 1, the front and rear disc assemblies 15 and 16 tend to roll on an arc 103 thereby producing in the harrow a rightward reaction which will cause the harrow to swing rightwardly into an offset position and then continue to travel along behind the pull bar 91 in such offset position. The harrow, adjusted as shown in Fig. 1, will readily turn to the left or in negative direction, but very strongly resists rightward turning and therefore makes it difficult to make a rightward turn.

My new harrow construction automatically relieves this resistance to rightward or positive turning by straightening or reducing the angle at which the front and rear sections are set. The turning attachment of the invention operates in the manner shown in Fig. 2. When the pulling vehicle or tractor is turned in positive or rightward direction so as to swing the pull bar 91 into an angled position relative to a forward line of travel, the draft hitch 46 will be swung therewith and the secondary draft member 61 will be moved rearwardly relative to the bar 41 causing the primary arm 67 to swing correspondingly and producing a partial rightward rotation of the crank 62 which results in the secondary arm 74 swinging into a position substantially as shown in Fig. 2 whereby to move the angling means rearwardly and to swing the rear harrow section 12 into a straightened or trailing position behind the front harrow section 11 relieving or removing the relative angularity of the front and rear sections 11 and 12 and very materially reducing resistance of the harrow to being turned in rightward or positive direction.

It will be noted that when the tractor or pulling vehicle and the harrow are moved forwardly along a straight line of travel, the secondary crank 74 of the actuating means or crank 62 projects in forward direction with but slight divergence toward the rightward, as shown in Fig. 1. When the pulling vehicle is turned leftwardly, the forward or outer end of the crank 74 swings leftwardly in the direction of an arrow 105 and therefore pulls the angling bar 57 forwardly only a relatively short distance, and therefore increases the angularity of the front and rear sections 11 and 12 only a slight amount during the making of a leftward turn. During the making of a rightward turn, however, the rearward movement of the forward end of the arm 74 is relatively great so that a pronounced swinging of the rear section 12 toward or into straightened position is thereby accomplished.

A few trials of the harrow with the pin 64 in different sets of holes 65 in the laterally extending structure 92 of the draft member 46 will quickly determine the proper eccentricity of the forward end of the member 61. When the harrow is adjusted for trailing movement only, by moving the bar 41 rearwardly on the bar 27, it is desirable to move the pin 64 and the forward end of the member 61 over to the innermost pair of holes 65, indicated at 110 in Fig. 1 so that the turning effect of the turning device will be reduced to a minimum. The turning device is so designed that it may be incorporated in new harrows as a part of their original construction or may be added to old harrows without the necessity of cutting, fitting or drilling parts in the field.

Although I have shown a simple and practical form of my invention, it is realized other mechanical equivalent parts or elements may be substituted for those disclosed herein in a manner to accomplish substantially identical results; therefore, it is to be understood that my invention is not limited to the details of this disclosure but should be accorded the scope of the following claims.

I claim as my invention:

1. Harrow construction of the character described, including: a front section and a rear section; a draft hitch; angling means for normally holding said sections in angled relationship; a draft device comprising a primary member and a secondary member, said secondary member being secured to said draft hitch eccentrically so as to be moved relative to said primary member when said draft hitch is turned laterally; and mechanism operated by said secondary member to positively move said sections from angled relationship whereby to reduce the turning resistance of the harrow.

2. Harrow construction of the character described, including: a front section and a rear section; a draft hitch; angling means for normally holding said sections in angled relationship; a draft device comprising a primary member and a secondary member, said primary and secondary members being so connected to said draft hitch as to be moved relative one to the other when said draft hitch is turned laterally relative to a forward line of travel; and mechanism connected to said primary and secondary members and operated in response to the relative movement of said primary and secondary members to positively move said sections from angled relationship and toward trailing position whereby to reduce the turning resistance of the harrow.

3. Harrow construction of the character described, including: a front section and a rear section; a draft hitch; angling means comprising a rigid bar for normally holding said sections in angled relationship; and a draft device comprising a primary member and a secondary member, said secondary member being secured to said draft hitch eccentrically so as to be moved relative to said primary member when said draft hitch is turned laterally; and actuating mechanism connected to said primary and secondary members, said actuating mechanism being connected to said angling means and being adapted to operate said angling means so as to apply a rearward thrust to move said sections toward trailing position when said draft hitch is turned relative to a forward line of travel.

4. A device as defined in claim 3, in which said actuating mechanism comprises essentially a bell crank having one arm thereof pivoted to said primary and secondary members and having the other arm thereof connected to said bar of said angling means.

5. A turning device for an offset harrow having a front section and a rear section, a draft means for connection to a puller, and interconnecting means connecting said front and rear sections together in angled relationship, comprising: an actuating member attached to said puller eccentrically so as to be moved in positive direction when said puller is turned in positive direction and negatively when said puller is turned in negative direction; and mechanism operated by said actuating member and coacting with said interconnecting means in a manner to positively force said front and rear sections toward positions of reduced angular relationship when said puller is turned in positive direction in changing the direction of travel of said puller and said harrow.

6. A turning device for an offset harrow having a front section and a rear section, a draft means for connection to a puller and interconnecting means pivotally connecting said front and rear sections together and including an angling bar for holding said sections in angled relationship; comprising: an actuating member attached to said puller eccentrically so as to be moved in positive direction when said puller is turned in positive direction and negatively when said puller is turned in negative direction; and mechanism operated by said actuating member and positively moving said angling bar in a manner to reduce the angular relationship of said front and rear sections when said puller is turned in positive direction in changing the direction of travel of said puller and said harrow.

7. A turning device for an offset harrow having a front section and a rear section, a draft part for connection to a puller, and interconnecting means between said front and rear sections, said interconnecting means including angling means for holding said front and rear sections in angled relationship, comprising: mechanism supported in movable relationship to said draft part, said mechanism being connected to said angling means so as to move said angling means and produce straightening of said front and rear sections; and linkage means connecting said mechanism to said puller whereby to move said mechanism positively when said puller is turned in positive direction, said means being under tension when said puller is moving in straight-line direction.

8. A device as defined in claim 7 in which said mechanism comprises a bell crank having an arm adapted for connection to said angling means, said arm extending forwardly when said puller is in a forward line of travel and being adapted to swing rearwardly when said mechanism is moved positively, and having a second arm connected to said linkage means.

9. A turning device for an offset harrow having a front section and a rear section, a draft part for connection to a puller, and interconnecting means between said front and rear sections, said interconnecting means including an angling bar for holding said front and rear sections in angled relationship, comprising: a bell crank rotatably mounted on said draft part, said crank having a primary arm extending laterally with respect to the longitudinal axis of said draft part and a secondary arm extending laterally to the same side of said longitudinal axis as said primary arm and being inclined forwardly at a small angle relative to the longitudinal axis of said harrow; a draft hitch for connecting said draft part to said puller, said draft hitch having a laterally extending structure; link means extending forwardly from said primary arm of said bell crank; means for connecting the forward end of said link means to said laterally extending structure of said draft hitch; and means connecting said secondary arm of said bell crank to said angling bar of said harrow.

10. A turning device for an offset harrow having a front section and a rear section, a draft part for connection to a puller, and interconnecting means between said front and rear sections, said interconnecting means including an angling bar for holding said front and rear sections in angled relationship, comprising: a bell crank rotatably mounted on said draft part, said crank having a primary arm extending laterally with respect to the longitudinal axis of said draft part and a secondary arm extending laterally to the same side of said longitudinal axis as said primary arm; a draft hitch for connecting said draft part to said puller, said draft hitch having a laterally extending structure; link means extending forwardly from said primary arm of said bell crank; means for connecting the forward end of said link means to said laterally extending structure of said draft hitch; and means connecting said secondary arm of said bell crank to said angling bar of said harrow.

11. A turning device for an offset harrow having a front section and a rear section, a draft part for connection to a puller, and interconnecting means between said front and rear sections said interconnecting means including an angling bar for holding said front and rear sections in angled relationship, comprising: a bell crank rotatably mounted on said draft part, said crank having a primary arm extending laterally with respect to the longitudinal axis of said draft part and a secondary arm extending laterally to the same side of said longitudinal axis as said primary arm; a draft hitch for connecting said draft part to said puller, said draft hitch having a laterally extending structure having a plurality of attaching positions therealong; link means extending forwardly from said primary arm of said bell crank; means for connecting the forward end of said link means to said laterally extending structure of said draft hitch at a selected one of said attaching positions; and means connecting said secondary arm of said bell crank to said angling bar of said harrow.

12. A turning device for an offset harrow having a front section and a rear section, a draft part for connection to a puller, and interconnecting means between said front and rear sections, said interconnecting means including an angling bar for holding said front and rear sections in angled relationship, comprising: a bell crank rotatably mounted on said draft part, said crank having a primary arm extending laterally with respect to the longitudinal axis of said draft part and a secondary arm extending laterally to the same side of said longitudinal axis as said primary arm and being inclined forwardly at a small angle relative to the longitudinal axis of said harrow; a draft hitch for connecting said draft part to said puller, said draft hitch having a laterally extending structure having a plurality of attaching positions therealong; link means extending forwardly from said primary arm of said bell crank; means for connecting the forward end of said link means to said laterally extending structure of said draft hitch at a selected one of said attaching positions; and means connecting said secondary arm of said bell crank to said angling bar of said harrow.

13. A draft connecting means of the character described, comprising: a bar adapted to extend laterally with respect to a line of movement, having an opening at one end thereof for connection to a draft member of an agricultural implement, and having a plurality of openings therealong for connection of a turning device; and means for securing said bar to the pull bar of a tractor.

In testimony whereof, I have hereunto set my hand at Los Angeles, California, this 23rd day of May, 1930.

JAMES S. STEWART.